Nov. 22, 1938.　　　M. C. ROWLEY　　　2,137,953
CONTROL MECHANISM
Filed Nov. 4, 1936
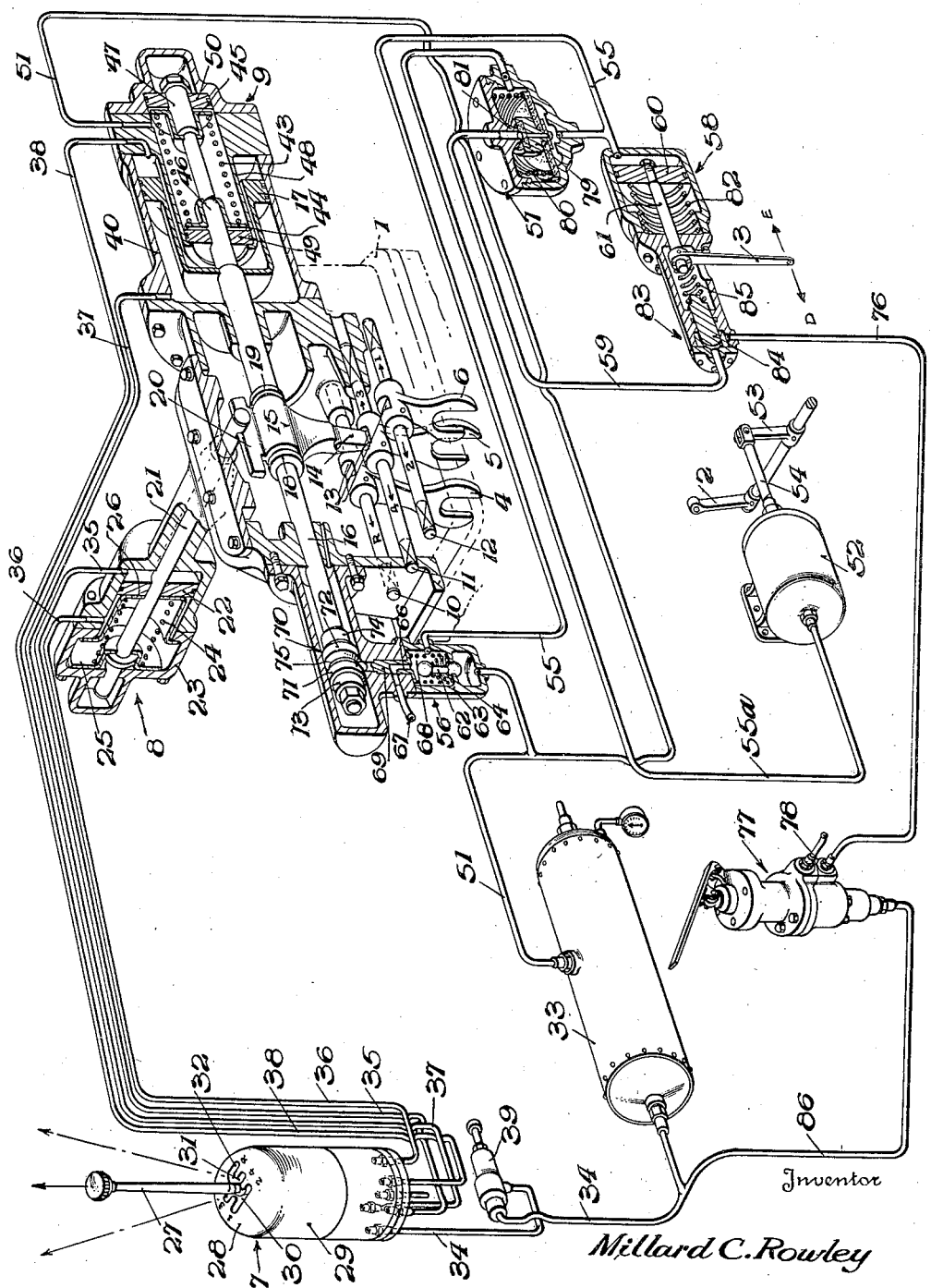
Inventor
Millard C. Rowley
By N. D. Parker
Attorney Patented Nov. 22, 1938

2,137,953

UNITED STATES PATENT OFFICE 2,137,953

CONTROL MECHANISM

Millard C. Rowley, Pittsburgh, Pa., assignor to Bendix-Westinghouse Automotive Air Brake Company, Pittsburgh, Pa., a corporation of Delaware Application November 4, 1936, Serial No. 109,198

12 Claims. (Cl. 192—3.5)

This invention relates to a vehicle control mechanism and more particularly to remote control apparatus for effecting operation of a transmission gearing and vehicle clutch devices.

One of the objects of the present invention is to provide a novel control apparatus in connection with a synchro-shift transmission which shall be so constituted that a minimum of operations will be required by the operator in controlling the shifting from one ratio to another as well as the engagement and disengagement of forward and rear clutches.

Another object of the invention is to provide novel control mechanism of the above character which shall be simpler in construction than those heretofore provided and which shall be effective to efficiently control the movements of the clutches, positioned forwardly and rearwardly of the transmission, in coordinated relation with the selection and establishment of a desired transmission gear ratio.

A further object is to provide, in a control mechanism for a synchro-shift transmission, a novel arrangement of parts whereby the operation of the clutches and the shifting of the gears may be effected by power and with a consequent expenditure of a minimum amount of effort on the part of the operator.

A still further object is to provide, in a mechanism of the above type, a novel arrangement of parts which shall be automatically operable to positively control clutch and transmission elements in an efficient manner.

Other objects and novel features of the invention will appear more fully hereinafter from the following detailed description when taken in connection with the accompanying drawing. It is to be expressly understood, however, that the drawing is employed for purposes of illustration only and is not designed as a definition of the limits of the invention, reference being had for this purpose to the appended claims.

In the drawing, the single figure of which illustrates in perspective, certain parts being shown in section, a transmission and clutch control device constructed in accordance with the present invention, a vehicle transmission gearing 1 of any suitable type has associated therewith forward and rear clutch-actuating members 2 and 3 respectively, the clutches controlled by such members being well known in the art and hence not being illustrated. The transmission 1 includes shifter forks 4, 5 and 6 engaged with the transmission gears or clutches, not shown, and are shiftable in the usual manner to establish a desired gear relation. In the present instance, a selection and establishment of the desired gear relation is effected through a power-operated mechanism remotely controlled through a manually-operable unit 7, the operation of such unit being controlled by the operator for effecting not only the establishment of the desired gear relation but also the proper operation of the clutch-controlling members 2 and 3 in a manner which will appear more fully hereinafter.

For the purpose of remotely effecting the selection and establishment of a desired gear relation, under the control of unit 7, the present invention provides a selecting fluid actuator 8 and a shifting fluid actuator 9, said actuators being associated with the usual shifter bars 10, 11 and 12 of the vehicle transmission 1. As shown, these bars carry the shifter forks 4, 5 and 6 which are provided with the usual slotted portions 13, adapted to be selectively engaged by the lower end 14 of a combined selector and shifter finger 15, the latter being slidably mounted on a piston rod 16 of a piston 17, the relative sliding movement between said finger and said piston rod being limited as by means of a pair of sleeves 18 and 19 secured to the piston rod. From this construction, it will be perceived that a slight amount of lost motion exists between the piston rod 16 and the finger 15, permitting movement of the former prior to movement of the latter. The finger 15 is, moreover, provided with an elongated flanged extension 20 having a suitable connection with a piston rod 21 carried by a piston 22, the last named piston being associated with the selector actuator 8 while the piston 17 is associated with the shifting actuator 9.

The actuator 8 is adapted to control the selecting movements of the member 15 through the connections above described, and, in order to secure such control, the same is adapted to be supplied with fluid pressure from the remotely-positioned controlling device 7. The actuator 8 includes a cylinder 23 housing the piston 22, and, in order that the latter may be normally centered with respect to the cylinder, for the purpose of maintaining the shifting finger 15 in the neutral position shown on the drawing, a single precompressed resilient device such as spring 24 is employed, the expansion of the spring in opposite directions being limited by means of cups 25 and 26. In assembling the parts of the actuator 8, the spring 24 is placed under a slight initial compression, and, from this construction, it will be readily observed that the piston rod 21, and hence the shifting finger 15, is resiliently maintained in a central or neutral position when fluid pressure is exhausted from both ends of the cylinder 23.

The remotely-positioned manually-operable control device 7 is located conveniently to the operator of the vehicle and is preferably constituted as disclosed in the application of Stephen Vorech, Serial No. 57,447, filed January 3, 1936, which matured into Patent No. 2,075,917, granted April 6, 1937. Such device includes two pairs of valve mechanisms adapted to be operated as by means of a control lever 27, movements of which are suitably guided as by means of a slotted cover 28 on a casing 29. As shown, the cover 28 is provided with a pair of parallel guiding slots 30 and 31 together with a third slot 32, all of said slots being connected together so that the lever 27 may be moved laterally from one to the other. With the present arrangement, movement of the control lever 27 to the left into slot 30 serves to effect operation of a valve controlling the flow of fluid pressure from a reservoir 33 to the right-hand end of actuator 8 through conduits 34 and 35, while movement of the lever 27 to the right into slot 32 serves to operate a valve within casing 29 to connect the reservoir with the left end portion of the actuator through conduits 34 and 36. It will, therefore, be apparent that lateral movement of the lever 27 to the left and right, as viewed in the drawing, serves to effect selecting operation of the actuator 8 in opposite directions. Forward movement of lever 27 in slot 30 serves to operate an additional valve within casing 29 in order to connect the reservoir 33 to the left-hand portion of actuator 9 by way of conduit 37, while rearward movement of the lever 27 in slot 30 operates a valve controlling the flow of fluid pressure from the reservoir to the right-hand portion of actuator 9 by way of conduits 34 and 38. From the foregoing, the construction and operation of unit 7 will be clear, it being borne in mind that lateral movement of the control lever 27 controls the selecting actuator 8, while longitudinal movements of the lever 27 in slots 30, 31 or 32 all serve to operate the same valves which control the flow of fluid pressure to the shifting actuator 9. Conduit 34 leading from the reservoir 33 to the intake chamber of the unit 7 may, if desired, have included therein any suitable type of fluid pressure-regulating valve 39 in order to limit the pressures which may be admitted to the transmission-controlling mechanism.

The shifting actuator 17 more particularly may be constructed as shown in the application of Roy S. Sanford, Serial No. 57,410, filed January 3, 1936, or in any other suitable manner. In the interests of simplicity, said actuator is shown herein as including a cylinder 40 housing the piston 17, the latter being secured to the piston rod 16 so as to impart movement thereto in either direction. In order to provide a construction for cushioning or retarding the movement of the shifter actuator when the gear relation is about to be established, the actuator 9 is provided with a precompressed spring 43 which is confined between a pair of cups 44 and 45, the engagement between the latter and sleeves 46 and 47 serving to limit the expansive force of the spring 43. The latter is housed within a cylinder 48 which houses a pair of pistons 49 and 50 which are respectively slidably mounted upon the sleeves 46 and 47. The pistons 49 and 50 are normally maintained in the position shown as by means of fluid pressure conducted from the reservoir 33 to the cylinder 48 by way of conduit 51, this construction forming not only a part of the cushioning means but also an efficient arrangement of automatically neutralizing the gear relations.

In order to effectively and efficiently control the operation of clutch-controlling members 2 and 3 in conjunction with the gear-shifting control mechanism heretofore described, the present invention utilizes a slight movement of the shifter piston rod prior to actual shifting movement of the selected shifter bar for the purpose of automatically controlling the forward and rear clutches, to the end that both of said clutches are completely disengaged prior to any movement of the selected shifter bar. In this manner, the transmission is isolated both from the vehicle engine and the driven shaft and the gear relation may thus be established without injury to the transmission. The construction is also such that, after establishment of the desired gear relation, the rear clutch is automatically permitted to engage prior to engagement of the front clutch, this sequence of operations being highly desirable when it is borne in mind that the rear clutch is generally of the jaw clutch type and is not designed for smooth engagement while taking up the load of the vehicle. The forward clutch, which engages after the rear clutch, closes automatically in a gradual and efficient manner, the arrangement completely avoiding any necessity on the part of the operator for manually controlling the forward clutch. However, the construction is such that the operator may manually control the forward clutch if desired.

For the accomplishment of the foregoing, the forward clutch control member 2 is adapted to be actuated by a fluid motor 52 through connections 53 and 54, said motor being adapted to be supplied with fluid pressure through conduits 55 and 55a by means of valve mechanism 56. A double check valve 57, which may be constructed in accordance with the disclosure of Vorech Patent 2,040,580, is inserted in conduit 55 and has associated therewith a conduit 59, the purpose of which will appear hereinafter. The conduit 55, in addition to supplying fluid pressure to the motor 52, also supplies fluid pressure to a fluid motor 58, the latter being provided with a piston 60 operatively connected through piston rod 61 to the rear clutch actuator 3.

The valve 56 includes a combined inlet and exhaust valve member 62 mounted within a casing 63 and normally urged as by a spring 64 to close off communication between conduits 51 and 55. The casing 63 is provided with an exhaust passage 66 connecting atmospheric connection 67 with outlet chamber 68. The exhaust passage is formed in a slidably-mounted valve-actuating element 69 which, when moved downwardly as shown in the drawing, serves to contact the valve assembly 62 and move the same downwardly, such operation serving to interrupt communication between the atmospheric connection 67 and outlet chamber 68 and establish communication between said outlet chamber and conduit 55. Such movement of the element 69 is effected by means of a cam member 70, secured to piston rod 16 and formed with cams 71 and 72. With this construction, movement of the piston rod 16 in either direction will effect valve-operating movement of the element 69 through cams 71 or 72. In either case, communication between passage 66 and chamber 68 will be cut off and fluid pressure will be conducted from conduit 51 through chamber 68 to the actuator 52 by way of conduits 55 and 55a, the flow of fluid pressure being also through the one-way check valve 57 in a manner which will appear more fully hereinafter. Continued movement of the piston rod 16, in order to establish the selected gear relation, will serve to align the reduced portions 73 or 74 of the cam element 70 with the element 69, whereupon the valve 56 will be returned to the position indicated in the drawing, it being pointed out that this operation takes place after the gear relation has been established. In the neutral position shown, the element 69 is aligned with the reduced cam 75 which permits communication between the clutch motor 52 and the conduit 59 by way of one-way check valve 57. The conduit 59 is in turn connected to a conduit 76 communicating with the exhaust chamber of a manually-controlled clutch-operating valve 77, said chamber being provided with an atmospheric connection 78 and functioning in a manner which will be more fully described in the following description. The valve 77 is preferably of the well-known self-lapping type, reference being had to the patent to Wilfred A. Eaton No. 2,112,484, granted March 29, 1938, for a more detailed disclosure thereof.

The one-way valve 57 heretofore referred to constitutes means for controlling the flow of fluid pressure to the fluid actuators 52 and 58 from the valve 56, and the arrangement is such that, after establishment of the desired gear relation, the rear clutch-controlling member 3 moves to clutch-engaged position prior to clutch-engaging movement of the member 2. To this end, the valve 57 is provided with a pressure-responsive valve element 79 normally maintained as by means of a spring 80 in the position shown, the element thus interrupting flow of fluid from the actuator 52 through conduit 55ª to the valve 56. It will be understood, however, that when valve 56 is operated to supply fluid pressure to conduit 55, the fluid pressure acting upon the valve element 79 will flex upwardly, the peripheral portion thereof connecting conduit 55ª to the clutch motor 52. Simultaneously, the upper portion of valve 79 will be held firmly against the valve seat 81 associated with the conduit 59, and thus communication between conduits 55ª and 59 will be cut off. Fluid pressure will thereupon be conducted to the actuators 58 and 52 in order to effect disengagement of the forward and rear clutches of the transmission, it being readily understood that the establishment of the selected gear relation may then be effected in an efficient manner.

After the desired gear relation has been established and valve 56 has been returned to normal position by reason of the engagement between the cam portions 73 or 74 with the valve-actuating element 69, the conduit 55 will exhaust through the valve 56. The piston 60 of the actuator 68 will thereupon be moved to the right, as viewed in the drawing, in order to effect engagement of the rear clutch, this movement being caused by a spring 82 positioned within the actuator 58. Simultaneously with the movement of valve 56 to the exhaust position in the release of pressure from the portion of conduit 55 leading to the valve 57, the valve element 79 of the latter will be deflected downwardly by virtue of the resulting pressure differential set up across said element, thus enabling conduit 55ª to be connected with the conduit 59. The connection of the latter to the valve 77 is controlled by a valve mechanism 83 having a valve element 84 associated therewith and controlled by the piston rod 61 of the actuator 58. As shown, the valve element 84 is resiliently connected as by a spring 85 with the end of the piston rod 61, and the construction is such that, with the rear clutch disengaged, the tension of spring 85 is increased to such a value that the valve element 84 interrupts communication between conduits 59 and 76. As soon, however, as the piston 60 has moved a sufficient distance to the right to initiate engagement of the rear clutch, the tension of spring 85 is relieved, and, since the spring is connected to the rod 61 and valve element 84, the said element will be moved to such a position as to connect conduit 59 with conduit 76. Fluid pressure from the actuator 52 may thereupon exhaust through said conduits and to the atmospheric connection 78 of valve 77, it being pointed out that the atmospheric connection 78 is sufficiently restricted in any suitable manner so as to effect a graduated return movement of the clutch actuator 52 and hence a gradual engagement of the forward clutch.

In certain instances, it may be desired to manually control the application and exhaust of fluid pressure to and from the forward clutch motor 52, in which event it is only necessary to operate the valve 77. It will be noted, however, that the valve is inoperative to control either clutch motor when both clutches are disengaged, this by reason of the fact that, although the valve 77 is in constant connection with the reservoir 33 by way of conduit 86, yet the conduit 76 leading from the outlet of said valve is shut off by the valve element 84. However, with the transmission in neutral position or in a gear-established condition, operation of the manually-controlled valve 77 will serve to supply fluid pressure to the forward clutch motor by way of conduit 76, valve 84, conduit 59, valve 57 and conduit 55ª. The valve 77, however, exerts no control over the clutch motor 58 associated with the rear clutch actuator, in view of the interposition of valve element 79 of the one-way check valve 57.

In operation, assuming that it is desired to establish first gear relation, the control lever 27 is moved forwardly in slot 30 of the controlling device 7, it being understood that the initial lateral movement of the control lever serves to conduct fluid under pressure to the right-hand portion of actuator 8 through conduits 34 and 35. The actuator 8 will promptly be operated in such a manner that the piston rod 21 is moved to the left and the shifter finger 15 rocked to a position such that the lower end 14 thereof engages the notch 13 of the shifter fork 6. Continued movement of the control lever 27 forwardly in the slot 30 serves to conduct fluid under pressure from the reservoir 33 to the left-hand end of the shifting actuator 9 by way of conduits 34 and 37. The piston 17 of the shifting actuator will thereupon be moved to the right carrying piston rod 16 and shifter finger 15 in the same direction. The shift rod 12 will thus be correspondingly moved and first gear relation will be established.

It will be noted, however, that, in view of the fact that member 15 is connected to the piston rod 16 through a lost motion connection, the initial movement of the shifter piston rod will not effect movement of the shifter finger until a predetermined degree of movement of the piston rod has been effected, such predetermined movement being defined by the position of sleeves 18 and 19 upon the piston rod 16. During this free movement of the piston rod, the valve-actuating element 69 of the valve 56 will be cammed downwardly by the cam 71, the valve 56 being accordingly operated in the manner heretofore described to supply fluid pressure to the forward and rear clutch actuators 52 and 58. The clutches controlled by such actuators will thereupon be promptly disengaged and this action ensures clutch disengagement prior to actual engagement of the gears establishing the first gear relation.

As heretofore pointed out, checking or cushioning means is associated with the shifting actuator 9 in order to retard that portion of the movement of the actuator when the gear relation is about to be effected. More particularly, as soon as the shifter actuator piston 17 and piston rod 16 have been moved a sufficient distance to the right as to bring cup 45 into engagement with piston 50, further movement of the piston assembly will serve to compress the preloaded spring 43. The remainder of the stroke of the piston assembly will thus be retarded or checked, thus ensuring that actual engagement of the selected transmission gears will be effected in a quiet and efficient manner. It will be observed that the above construction is such that the retarding means constituted by the spring 43 does not influence the stroke of the piston assembly until the gear relation is about to be established. In other words, the initial movement of the piston assembly takes place in a rapid manner under the influence of the pressure of the fluid exerted against the piston 17 and thus the gear relation is quickly established, consistent with efficient operation as well as the elimination of gear clashing.

Adjacent the limit of the stroke of the shifter piston and after engagement of the gears establishing first gear ratio, the valve-actuating element 69 of the valve 56 becomes aligned with the cam portion 73. When this occurs, valve 56 is moved to exhaust position. The actuator 58 promptly exhausts through the conduit 55 connecting said actuator and the chamber 68 of valve 56 and the rear clutch-controlling element 3 is thus moved to engage the rear clutch through the influence of spring 82. As soon as this engagement has been initiated, the valve 84 is moved to the right, as viewed in the drawing, in order to connect conduits 59 and 76, the actuator 52 thus exhausting through valve 77 by way of conduit 55ª, one-way check valve 57 and interconnected conduits 59 and 76. The forward clutch thereupon smoothly engages and the operator may accelerate the vehicle in first speed relation.

In the event that it is now desired to establish the second gear relation, the control lever 27 is moved to the right in slot 30, this action exhausting the valve controlling the flow of fluid pressure to conduit 37 and operating another valve supplying fluid pressure through conduit 38 to the right-hand portion of the shifting actuator 9, while maintaining the flow of fluid pressure through conduit 35. When the first named valve is moved to exhaust position and the shifting actuator 9 is hence connected to atmosphere, the neutralizing piston 49, associated with the shifter actuator piston rod 16 and being constantly subjected to fluid pressure through conduit 51, promptly moves the shifter actuator to neutral position. In returning to neutral position, it will be noted that initial movement of the shifter piston rod 16 will effect operation of the clutch-controlling valve 56 through the cam 71 and thus both the forward and rear clutches will be disengaged in the manner heretofore described. This operation of the clutches is effected prior to actual disengagement of the transmission gears by reason of the lost motion connection between the shifter finger 15 and the shifter piston rod 16, the actual disengagement of the gears being thus readily effected in view of the absence of transmission of torque thereby.

When the neutralizing operation above described has been completed, it will also be understood that the valve-actuating element 69 of valve 56 becomes aligned with reduced cam 75. The valve 56 is thus moved to exhaust position and the parts are returned to the position shown on the drawing, the engagement of the rear clutch taking place prior to engagement of the forward clutch in the manner described above. Manual operation of the valve controlling the flow of fluid pressure through conduit 38, through control lever 27, will thereupon move the shifter piston 17 to the left, as viewed in the drawing, in order to establish second gear relation. Initial movement of the shifter piston will, however, effect operation of the clutch valve 56, thereby causing disengagement of the forward and rear clutches prior to establishment of second gear relation, and, when this relation is established, the rear and forward clutches will be sequentially engaged in the same manner as above described in connection with the establishment of the first gear relation.

Third gear relation is established by movement of the control lever 27 forwardly in the slot 31, this action causing shifting movement of the shifter bar 11 to the right, as viewed in the drawing. During establishing of third gear relation, no movement of the selector actuator takes place and fluid pressure is conducted directly to the left-hand portion of the shifter actuator through conduit 37.

Fourth gear relation is established by movement of the control lever 27 to the right in slot 31, such movement controlling the flow of fluid pressure directly to the shifter actuator 9 by way of conduit 38.

Selection and establishment of reverse gear relation is effected through movement of the control lever 36 to the right-hand extremity of slot 32, such movement establishing sequential selection of the shifter bar 10 and shifting of the latter to the left, as viewed in the drawing.

By the present invention, there has thus been provided a relatively simple and efficiently-operable control mechanism for a synchro-shift transmission. While a single valve operable prior to the actual shifting of the gears is provided for controlling the clutch-disengaging movements of the forward and rear clutches, yet a sequential engaging movement of said clutches is effected by controlling the exhaust of the forward clutch motor by movement of the rear clutch motor. In addition to the automatic clutch operation during a gear shift, manual control of the forward clutch is retained by the provision of the manually-controllable clutch valve. The construction and arrangement of the parts is compact and lends itself especially adaptable to the control of synchro-shift transmissions located remotely from the operator.

While one embodiment of the invention has been illustrated and described herein with considerable particularity, it is to be understood that the invention is not limited thereto but is capable of a variety of mechanical expressions, as well understood by those skilled in the art. Reference will, therefore, be had to the claims appended hereto for a definition of the limits of the invention.

What is claimed is:

1. In combination with a shiftable gear-changing element, a forward clutch-operating member, a rear clutch-operating member, and means energized by initial movement of said element in either of opposite directions from a neutral position for operating both said members, said last named means including a single controlling device operated by said element.

2. In combination with a shiftable gear-changing element, a forward clutch-operating member, a rear clutch-operating member, and fluid pressure means energized by initial movement of said element in either of opposite directions from a neutral position for operating both said members, said last named means including a single valve device operated by said element.

3. In combination with a shiftable gear-changing element, a forward clutch-operating member, a rear clutch-operating member, and fluid pressure means for operating both said members, said means comprising a single valve device operated by initial movement of said element in either of opposite directions from a neutral position, a connection from said device to the fluid pressure means for the forward member, a connection between the device and the fluid pressure means for the rear member, and a check valve in said first named connection.

4. In combination with a shiftable gear-changing element, a forward clutch-operating member, a rear clutch-operating member, and fluid pressure means for operating both said members, said means comprising a single valve device operated by initial movement of said element in either of opposite directions from a neutral position, a connection from said device to the fluid pressure means for the forward member, a connection between the device and the fluid pressure means for the rear member, an exhaust connection for the fluid pressure means for the forward member, and a valve controlled by the fluid pressure means for the rear member for controlling the last named connection.

5. The combination with an automotive vehicle transmission having forward and rear clutches provided with fluid motors for controlling the disengaging and engaging movements thereof, of a shifter member reciprocable in opposite directions from a neutral position to establish either one of a pair of gear ratios, a valve operable by said movements of said member for controlling the flow of fluid pressure to said motors, and means controlled by the rear clutch motor for delaying clutch-engaging movement of the forward clutch motor until sufficient movement of the rear clutch motor has been effected as to initially engage the rear clutch.

6. The combination with an automotive vehicle transmission having forward and rear clutches provided with fluid motors for controlling the disengaging and engaging movements thereof, of a shifter member reciprocable in opposite directions from a neutral position to establish either one of a pair of gear ratios, and a single valve operated by said movements of said member for controlling the application of a fluid pressure differential to both of said motors to effect clutch-disengaging movement thereof.

7. The combination with an automotive vehicle transmission having forward and rear clutches provided with fluid motors for controlling the disengaging and engaging movements thereof, of a shifter member reciprocable in opposite directions from a neutral position to establish either one of a pair of gear ratios, a single valve operated by said movements of said member for controlling the application of a fluid pressure differential to both of said motors to effect clutch-disengaging movements thereof, and means operated by said rear clutch motor for controlling the exhaust from said forward clutch motor.

8. The combination with an automotive vehicle transmission having forward and rear clutches provided with fluid motors for controlling the disengaging and engaging movements thereof, of a shifter member reciprocable in opposite directions from a neutral position, fluid means for effecting said movements of said member, a shifter bar associated with the transmission gears, means including a lost motion connection for connecting said member and bar whereby said member has a limited movement prior to combined movement of the member and bar, and a single valve device operated by said member during said limited movement for supplying a fluid pressure differential to said motors.

9. In combination with a shiftable gear-changing element, a forward clutch-operating member, a rear clutch-operating member, fluid motors for operating said members, a single valve operated by gear-establishing movement of said element for controlling the application of a fluid pressure differential to said motors, said valve being moved to exhaust position upon completion of said movement of said element to exhaust the motor for the rear member, and means for delaying the exhaust from the motor for the forward member whereby clutch-engaging movement of the forward member follows clutch-engaging movement of the rear member.

10. In combination with a shiftable gear-changing element, a forward clutch-operating member, a rear clutch-operating member, fluid motors for operating said members, a single valve operated by gear-establishing movement of said element for controlling the application of a fluid pressure differential to said motors, said valve being moved to exhaust position upon completion of said movement of said element to exhaust the motor for the rear member, and means controlled by clutch-engaging movement of the last named motor for delaying the exhaust from the motor for the forward member, whereby sequential clutch-engaging movement of said members is effected.

11. In combination with a shiftable gear-changing element, a forward clutch-operating member, a rear clutch-operating member, fluid motors for operating said members, a single valve operated by gear-establishing movement of said element for controlling the application of a fluid pressure differential to said motors, said valve being moved to exhaust position upon completion of said movement of said element to exhaust the motor for the rear member, and a valve controlled by the last named motor for preventing exhausting of the motor for the forward member until a predetermined movement of the motor for the rear member has taken place.

12. The combination with an automotive vehicle transmission having forward and rear clutches provided with fluid motors for controlling the disengaging and engaging movements thereof, of a shifter member reciprocable in opposite directions from a neutral position to establish either one of a pair of gear ratios, a single valve operated by said movements of said member for controlling the application of a fluid pressure differential to both of said motors to effect clutch-disengaging movements thereof, and means operated by said rear clutch motor for initiating clutch-engaging movemest of said forward clutch motor,

MILLARD C. ROWLEY.